(No Model.)

E. H. GABUS.
CROSSCUT SAW.

No. 271,056. Patented Jan. 23, 1883.

Witnesses:
Louis Auger
Fred Loury

Inventor.
Emile H. Gabus
George E. Lemon
Atty.

UNITED STATES PATENT OFFICE.

EMILE H. GABUS, OF STRYKER, OHIO.

CROSSCUT-SAW.

SPECIFICATION forming part of Letters Patent No. 271,056, dated January 23, 1883.

Application filed March 1, 1882. (No model.)

*To all whom it may concern:*

Be it known that I, EMILE H. GABUS, a citizen of the United States, residing at Stryker, in the county of Williams and State of Ohio, have invented a new and useful Improvement in Crosscut-Saws, of which the following is a specification.

This invention relates to certain new and useful improvements in crosscut or reciprocating saws; and it consists in providing such a saw-blade with a longitudinal guide mark or groove, which is parallel with the points of the teeth, and which will serve as a guide when it is desirable to sharpen the saw, whereby the original set, curve, or configuration of the teeth may be preserved.

My invention also consists in providing a crosscut or reciprocating saw having cutting and clearing teeth of different altitudes with guide-marks, which are located near the central portion of the blade, and are parallel with each other and with the point of the saw-teeth, as will be hereinafter more fully set forth, and specifically pointed out in the claims.

Figure 1:
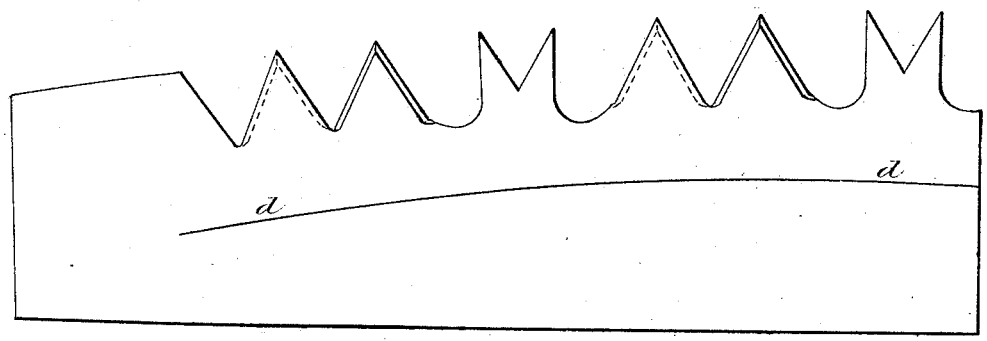
Figure 2:
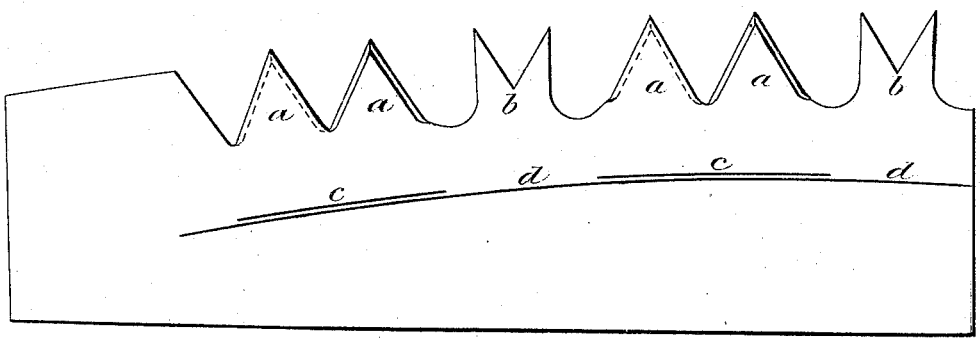

In the annexed drawings, which illustrate my invention, Figure 1 represents a crosscut-saw which is provided with teeth of the same altitude, and which saw is provided with a single guide-line. Fig. 2 is a similar view, showing a saw having teeth of different altitudes and provided with guide-marks which are parallel with each other, and are separated laterally by a space equal to the different altitudes of the teeth.

In Fig. 1 of the annexed drawings I have shown a crosscut-saw which is provided with teeth of equal height, or only cutting-teeth, on which saw I provide a mark which consists of a slight indentation which will be parallel with the ends or points and base of the teeth. This mark *a* extends the whole length of the saw or under the teeth, as shown. This guide or mark *a* consists of a groove or line, which is cut into the saw-blade to a sufficient depth to act as a guide for one end of a pair of dividers or other suitable gage.

In Fig. 2 of the drawings, *a a* represent the cutting-teeth, and *b b* the drag or clearing teeth. *c c* represent the guide or line by which the cutting-teeth are measured, so as to be adjusted when sharpening the same. *d d* is the line from which the altitude of the drag-teeth is measured. These lines or guides are parallel with each other and with the edge of the teeth of the saw, and are on the same curve as the point and throat of the teeth when the saw is new, and, being new, are supposed to be properly set.

In adjusting or resharpening the saw, I use a pair of dividers or calipers, and place one point of the same in the guide opposite the tooth to be measured. The other point is adjusted so as to reach the point of the tooth to be sharpened, which is done by filing in the usual manner, and the tooth is reduced until the point coincides with the end of the arm of the dividers. In sharpening, the lowest or most worn of one of the teeth will be taken as a guide, and the other teeth will be filed away so as to correspond with the same. In this manner the teeth can be measured while filing, so as to bring them to an equal and proper length, and at the same time preserve the original groove.

I am aware that prior to my invention circular saws have been made having a cutting-edge of less thickness than the eye and intermediate tapering portion, which tapering portion joins the eye and the outer or cutting edge of the saw, so as to produce an elevation of the metal; but this elevation does not form a rest or positive gage by which the teeth can be measured with certainty when it is desirable to file or sharpen them.

I am also aware that saws have been provided with apertures arranged parallel with the base or throat of the teeth to facilitate dressing or sharpening the teeth, which apertures have been formed either by perforating or cutting away a part of the metal and then forcing the severed portion back into place, so as to be flush with the saw. It is evident to those skilled in the art of saw-making that though these openings facilitate sharpening by previously severing a part of the metal, they also weaken the saw, and that they do not provide a means whereby the points of the teeth can be gaged so as to set them properly, especially when the clearing and cutting teeth are of different heights. These indentations have been provided more especially for the proper adjustment of the throat of the tooth, and not the point. Circular saws have also been made in which the back of the teeth formed sections of epicycloidal curves, so that they may be sharpened by reducing the front edge of each tooth in a spiral course. In this case each tooth is provided with a separate and distinct gage-line, and a saw would have to be provided with as many marks as there are teeth. It is evident by my construction I provide a saw-blade which can be sharpened so as to provide a proper set by unskilled labor, and by the assistance of a pair of dividers a true and proper set of the saw, so as to obtain the best results, can always be preserved, and these marks, which extend longitudinally on the saw-blade, will not weaken the same; also, the lines, being placed parallel with each other in saws having teeth of different heights, afford a ready means whereby the teeth can be gaged, so as to preserve the proper altitude of both the drag and the cutting teeth.

Having thus described my invention, what I claim as new, and desire to secure by Letters Patent, is—

1. As a new and improved article of manufacture, a crosscut or drag saw provided with a line or indentation parallel with the points of the teeth and opposite thereto, for the purpose of providing a guide or measuring-point in sharpening the saw, substantially as described.

2. A crosscut or drag saw having cutting and clearing teeth of different altitudes, and provided with longitudinal lines or indentations, which are parallel with the points of the teeth, and are separated from each other by a space equal to the difference in the altitude of the cutting and clearing teeth, substantially as shown, and for the purpose set forth.

Signed by EMILE H. GABUS this 30th day of January, A. D. 1882.

EMILE H. GABUS.

In presence of—
 MELVIN M. BOOTHMAN,
 HERMANN PREUSSER.